United States Patent
Takebayashi et al.

(10) Patent No.: US 8,057,935 B2
(45) Date of Patent: Nov. 15, 2011

(54) LITHIUM ION RECHARGEABLE BATTERY

(75) Inventors: Hitoshi Takebayashi, Osaka (JP); Makoto Hongu, Osaka (JP); Tetsuro Tojo, Osaka (JP); Shinji Saito, Tsu (JP); Takehiko Sawai, Tsu (JP); Katsuyuki Negishi, Tokyo (JP); Masahiro Kikuchi, Tokyo (JP)

(73) Assignees: Toyo Tanso Co., Ltd., Osaka-shi (JP); Nippon Chemical Industrial Co., Ltd., Tokyo (JP)

( * ) Notice: Subject to any disclaimer, the term of this patent is extended or adjusted under 35 U.S.C. 154(b) by 0 days.

(21) Appl. No.: 12/092,485

(22) PCT Filed: Oct. 6, 2006

(86) PCT No.: PCT/JP2006/320076
§ 371 (c)(1), (2), (4) Date: May 2, 2008

(87) PCT Pub. No.: WO2007/052440
PCT Pub. Date: May 10, 2007

(65) Prior Publication Data
US 2009/0239145 A1   Sep. 24, 2009

(30) Foreign Application Priority Data
Nov. 2, 2005  (JP) .................................. 2005-319647

(51) Int. Cl.
*H01M 4/505* (2010.01)
*H01M 4/525* (2010.01)
*H01M 4/04* (2006.01)

(52) U.S. Cl. ............. 429/231.95; 429/231.9; 429/218.1; 429/209

(58) Field of Classification Search ............. 429/231.95, 429/231.9, 218.1, 209
See application file for complete search history.

(56) References Cited

U.S. PATENT DOCUMENTS
5,773,168 A    6/1998  Kubo et al.
2005/0084764 A1 * 4/2005  Lee et al. ..................... 429/317

FOREIGN PATENT DOCUMENTS

| | | |
|---|---|---|
| EP | 0 851 515 A2 | 7/1998 |
| JP | 5 41252 | 2/1993 |
| JP | 8 213014 | 8/1996 |
| JP | 08-213014 * | 8/1996 |
| JP | 11-297298 * | 10/1999 |
| JP | 11 297298 | 10/1999 |
| JP | 11 317217 | 11/1999 |
| JP | 2000 113907 | 4/2000 |
| JP | 2000 149945 | 5/2000 |
| JP | 2001 210325 | 8/2001 |
| JP | 2003-077460 * | 3/2003 |
| JP | 2003 77460 | 3/2003 |
| JP | 2004 192896 | 7/2004 |
| JP | 2005 11688 | 1/2005 |
| JP | 2005011688 A * | 1/2005 |
| JP | 2005 259703 | 9/2005 |
| JP | 2006 202678 | 8/2006 |

OTHER PUBLICATIONS

Office Action issued Apr. 19, 2011, Japanese Application No. 2005-319647, filed Nov. 2, 2005 (with English-language Translation).
Japanese Office Action dated Aug. 17, 2011 issued in the corresponding Japanese Patent Application No. 2005-319647, filed Nov. 2, 2005.

* cited by examiner

*Primary Examiner* — Jerry A Lorengo
*Assistant Examiner* — Jared Wood
(74) *Attorney, Agent, or Firm* — Oblon, Spivak, McClelland, Maier & Neustadt, L.L.P.

(57) ABSTRACT

A high power lithium-ion secondary battery having an increased capacity and capable of maintaining high discharge voltage and repeating charging/discharging high current. A lithium-ion secondary battery having an electrode group formed by laminating or winding a negative electrode layer and a positive electrode layer so as to interpose a separator made of synthetic resin, the negative electrode layer containing a material capable of intercalating/deintercalating lithium-ion, and the positive electrode layer including a lithium-containing metallic oxide; and a non-aqueous electrolyte containing lithium salt, where the electrode group is immersed. The positive electrode material unit contains a fluorinated lithium-containing metallic oxide as a main material, and the separator possesses a hydrophilic group. Further, the positive electrode material preferably contains a main material including $LiNi_xCo_yMn_zO_2$, where $0.6 \leqq x < 1$, $0 < y \leqq 0.2$, $0 < z \leqq 0.2$, and $x+y+z=1$.

7 Claims, No Drawings

LITHIUM ION RECHARGEABLE BATTERY

TECHNICAL FIELD

The present invention relates to a high power lithium-ion secondary battery.

BACKGROUND ART

A lithium-ion secondary battery having a negative electrode layer formed with a material capable of intercalating/deintercalating lithium-ion is able to suppress deposition of dendrite more effectively compared to a lithium-ion secondary battery having a negative electrode layer formed with metallic lithium. Therefore, the former lithium-ion secondary battery has the advantage of providing an increased capacity and energy density while improving the safety by preventing electrical short circuit.

While there is demand for a further increase in capacity of the lithium-ion battery, the flatness of discharge voltage and a high output of a lithium-ion secondary battery have been also in demand in recent years. Under such a circumstance, various attempts have been made. Examples of the attempts include: to increase the capacity of a positive electrode metallic lithium oxide composite and a negative electrode material themselves, which are electro chemical reactants; to increase the planer dimension of an electrode at the designing stage, and to increase the amount of reactant by thinning a separator. (Refer to the below patent documents 1 to 5)

[Patent Bibliography 1]
Japanese Unexamined Patent Publication No. 8-213014
[Patent Bibliography 2]
Japanese Unexamined Patent Publication No. 2000-113907
[Patent Bibliography 3]
Japanese Unexamined Patent Publication No. 2001-210325
[Patent Bibliography 4]
Japanese Unexamined Patent Publication No. 2004-192896
[Patent Bibliography 5]
Japanese Unexamined Patent Publication No. 2005-11688

DISCLOSURE OF THE INVENTION

Problems to be Solved by the Invention

Although it is possible to increase the capacity of a lithium-ion secondary battery with the techniques that have been disclosed, techniques to maintain high discharge voltage and achieve a high output is yet to be found. Therefore, unlike a nickel-cadmium battery and a nickel-hydrogen battery, it is impossible to expand the application of a lithium-ion secondary battery to a use requiring a high current discharge, which is a considerable disadvantage of a lithium-ion secondary battery. Further, when a cycle of charging/discharging a high current is repeated, the expansion/shrinkage of the negative electrode material caused cracking in a negative electrode layer and caused a loss in the conductivity between the particles of the negative electrode material thus increasing the resistance. As a result, a lithium-ion secondary battery is not able to supply a high current.

The object of the present invention is to provide a high output lithium-ion secondary battery having an increased capacity, capable of maintaining high discharge voltage and repetitively performing charging/discharging of a high-current.

Means to Solve the Problems and Effects of the Invention

A lithium-ion secondary battery of this invention includes; an electrode group formed by laminating or winding a negative electrode layer and a positive electrode layer so as to interpose a separator made of synthetic resin, the negative electrode layer containing a material capable of intercalating/deintercalating lithium-ion, and a positive electrode layer including a lithium-containing metallic oxide; and a non-aqueous electrolyte solution including lithium salt, where the electrode group is immersed. The lithium-ion secondary battery also includes a positive electrode layer having a fluorinated lithium-containing metallic oxide as a main material, and a separator containing a hydrophilic group.

Preferably, the positive electrode layer of a lithium-ion secondary battery of this invention contains a main material of $LiNi_xCo_yMn_zO_2$, where $0.6 \leq x < 1$, $0 < y \leq 0.2$, $0 < z \leq 0.2$, and $x+y+z=1$.

The element composition of the positive electrode layer is the same as the one claimed in Japanese Patent Application No. 2005-101258, and the validity of its composition range conforms to the specification of the above patent application. Hence, the positive electrode layer yields the effects of the above patent application in the lithium-ion secondary battery of this invention. Further, "hydrophilic group" in this invention mainly refers to a functional group such as a carboxyl group.

The above structure provides a high-power lithium-ion secondary battery with an increased capacity, and is capable of maintaining a high discharge voltage and repeating charging/discharging a high current.

A lithium-ion secondary battery of this invention preferably adapted so that vapor-grown graphite or carbon black in the positive electrode layer or the negative electrode layer, so that and at least 5 wt % of the vapor-grown graphite or carbon black is added to the positive electrode layer, or at least 2 wt % of vapor-grown graphite or carbon black is added to the negative electrode layer. More specifically, it is preferred that at least 9 wt % but not more than 14 wt % is added to the positive electrode layer, and at least 3 wt % but not more than 6 wt % is added to the negative electrode layer.

With the above structure, it is possible to further improve the high current charge/discharge cycle characteristic.

BEST MODE FOR CARRYING OUT THE INVENTION

The following describes the lithium-ion secondary battery of this invention in detail with examples and a comparative example. A method of manufacturing an electrode and a battery is described below. By suitably combining a positive electrode, a negative electrode, and a separator, a sample battery was created in each example.

EXAMPLES 1 to 8

Positive Electrode 1

A positive electrode active material was made from a fluorinated lithium-containing oxide having an atomic ratio of $LiNi_{0.8}Co_{0.1}Mn_{0.1}O_2$. Then, 10 w/t parts of a conductive agent (vapor-grown graphite), 5 w/t parts of polyvinylidene fluoride as a binding agent, and N-Methylpyrrolidone serving as a dispersal solvent are added to 85 w/t parts of the active material, and the mixture was kneaded to prepare a positive electrode mixture (slurry). The slurry was applied on both surfaces of a piece of 20 μm thick aluminum foil serving as a current collector. Through processes of drying, cutting, and pressing, a 130 μm thick positive electrode including aluminum foil was obtained.

The fluorination of $LiNi_{0.8}Co_{0.1}Mn_{0.1}O_2$ was processed under the following conditions so that the lithium-containing oxide contains 0.1 wt % of atom F at the end. The content of atom F in the lithium-containing oxide can be varied by means of adjusting the conditions of fluorination. In the present example, an appropriate amount is 0.01 to 0.2 wt %. If the atom F content is less than 0.01 wt %, the gelation of the slurry cannot be avoided. If the atom F content is greater than 0.2 wt %, the battery resistance increases and the capacity of the battery decreases.

(Conditions of Fluorination)

$LiNi_{0.8}Co_{0.1}Mn_{0.1}O_2$ was placed into a stainless chemical reactor and the pressure was reduced with a vacuum pump. Then, 10 kPa of fluorine gas and 90 kPa of nitrogen gas were introduced, and the fluorination process was performed at 20° C. for one hour.

Positive Electrode 2

A positive electrode active material was made from a lithium-containing oxide having an atomic ratio of $LiNi_{0.8}Co_{0.1}Mn_{0.1}O_2$ by fluorinating the lithium-containing oxide under the same conditions as above so as to contain 0.1 wt % of atom F. Then, 2 w/t parts of a conductive agent (vapor-grown graphite), 3 w/t parts of polyvinylidene fluoride as a binding agent, and N-Methylpyrrolidone as a dispersal solvent are added to 95 w/t parts of the active material. The mixture was then kneaded to prepare a positive electrode mixture (slurry). The slurry was applied on both surfaces of a piece of 20 μm thick aluminum foil serving as a current collector. After processes of drying, pressing, and cutting, a 130 μm thick positive electrode including aluminum foil was obtained.

Negative Electrode 1

3 w/t parts of a conductive agent (vapor-grown graphite), and 6 w/t parts of polyvinylidene fluoride as a binding agent were added to 91 w/t parts of graphite powder as a negative electrode active material. Then, N-methylpyrrolidone as a dispersal solvent was added, and the mixture was kneaded to prepare slurry. The graphite powder used was a commercial highly crystalline graphite material, which is natural or artificial graphite covered with low crystalline carbon. The slurry was then applied on both surfaces of a piece of rolled copper foil of 10 μm in thickness. After the processes of drying, pressing, and cutting, a 110 μm thick negative electrode including rolled copper foil was obtained.

Negative Electrode 2

94 w/t parts of graphite powder as a negative electrode active material and 6 w/t parts of polyvinylidene fluoride as a binding agent were added. To this mixture, N-methylpyrrolidone as a dispersal solvent was added. Then, slurry was prepared kneading the mixture. The graphite powder used was a commercial highly crystalline graphite material, which is natural or artificial graphite covered with low crystalline carbon. The slurry was then applied on both surfaces of a piece of rolled copper foil of 10 μm in thickness. After processes of drying, pressing, and cutting, a 110 μm thick negative electrode including rolled copper foil was obtained.

[Separator 1]

A 20 μm thick polyethylene separator was hydrophlized with fluorine gas and oxygen gas, and then a hydrophilic group (a carboxyl group and the like) was introduced thereto.

The hydrophilization was processed under the following conditions so that the resulting polyethylene separator contains 2.5 wt % of carboxyl group. The carboxyl group content can be varied by means of adjusting the conditions of hydrophilization. In this example, the appropriate amount is 0.1 to 5 wt %. The carboxyl group content of less than 0.1 wt % results in insufficient hydrophilicity, while hydrophilization that results in the carboxyl group content of more than 5 wt % exacerbates the degradation of the separator.

(Conditions of Hydrophilization)

A 20 μm thick polyethylene separator was placed into a stainless chemical reactor and the pressure was reduced with a vacuum pump. Then, 1 kPa of fluorine gas and 100 kPa of oxygen gas were introduced, and the hydrophilization process was performed at 20° C. for ten minutes.

[Separator 2]

An ordinary 20 μm thick polyethylene separator without the above hydrophilization was adopted.

An electrode group was formed by winding one of the positive electrodes and one of the negative electrodes prepared in the above mentioned manner, interposing one of the separators prepared in the above mentioned manner between the positive and negative electrodes. This electrode group is placed into a cylindrical battery container. Then, a predetermined amount of electrolyte is injected, and the upper lid is sealed by means of caulking thereafter. Thus, cylindrical lithium-ion secondary batteries of examples 1 to 8 shown in below Table 1 were obtained. The electrolyte adopted was prepared by dissolving 1 mol/liter of lithium hexafluorophosphate ($LiPF_6$) into the solution containing the volume ratio of EC:MEC:DEC=25:60:15. The designed capacity of each of the batteries was 1600 mAh.

Example 9

Positive Electrode 3

A positive electrode active material was made from a lithium-containing oxide having an atomic ratio of $LiNi_{0.8}Co_{0.1}Mn_{0.1}O_2$ by fluorinating the oxide in the same way as Positive Electrode 1 so as to contain 0.1 wt % of atom F. Then, 85 w/t parts of the above active material, 10 w/t parts of an conductive agent (mixture of vapor-grown graphite and carbon black), 5 w/t parts of polyvinylidene fluoride as a binding agent, and N-Methylpyrrolidone as a dispersal solvent were added. The mixture is then kneaded to prepare a positive electrode mixture (slurry). The slurry was applied on both surfaces of a piece of 20 μm thick aluminum foil serving as a current collector. After the processes of drying, pressing, and cutting, a 130 μm thick positive electrode including aluminum foil was obtained.

Negative Electrode 3

91 w/t parts of graphite powder as a negative electrode active material, 3 w/t parts of a conductive agent (mixture of vapor-grown graphite and carbon black) and 6 w/t parts of polyvinylidene fluoride as a binding agent were added. To this mixture, N-methylpyrrolidone as a dispersal solvent was added. Then, slurry was prepared kneading the mixture. The graphite powder used was a commercial highly crystalline graphite material, which is natural or artificial graphite covered with low crystalline carbon. The slurry was then applied on both surfaces of a piece of rolled copper foil of 10 μm in thickness. After processes of drying, pressing, and cutting, a 110 μm thick negative electrode including rolled copper foil was obtained.

[Separator 3]

A 20 μm thick polyethylene separator was hydrophlized with fluorine gas and oxygen gas as is done in Example 1, and then 2.5 wt % of hydrophilic group (carboxyl group and the like) was introduced thereto. Thus, Separator 3 was obtained.

An electrode group was formed by winding the positive electrode and the negative electrode prepared in the above mentioned manner, interposing the separator prepared in the above mentioned manner between the positive and negative electrodes. This electrode group is placed into a cylindrical battery container. Then, a predetermined amount of electrolyte is injected, and the upper lid is sealed by means of caulking thereafter. Thus, cylindrical lithium-ion secondary battery of example 9 was obtained. The electrolyte adopted was prepared by dissolving 1 mol/liter of lithium hexafluorophosphate ($LiPF_6$) into the solution containing the volume ratio of EC:MEC:DEC=25:60:15. The designed capacity of each of the batteries was 1600 mAh.

COMPARATIVE EXAMPLE 1

Positive Electrode 4

Although a battery having a positive electrode material including a lithium-containing oxide having the atomic ratio of $LiNi_{0.8}Co_{0.1}Mn_{0.1}O_2$ without fluorination should be prepared for comparative example 1, Ni atomic ratio of 0.4 or more, particularly Ni atomic ratio of 0.8 or more as in this example for achieving a higher capacity, will cause a problem that an electrode plate itself cannot be made due to the gelation occurring during the formation of slurry. Hence, a material having the atomic ratio of $LiNi_{0.33}Co_{0.33}Mn_{0.33}O_2$, which is not easily gelated although it will not increase the capacity, was adopted for comparative example 1. As for the mixing ratio, 2 w/t parts of a conductive agent (vapor-grown graphite) and 3 w/t parts of polyvinylidene fluoride as a binding agent were added to 95 w/t parts of the active material. Then, N-methylpyrrolidone to the active material as a dispersal solvent was added, and the mixture was kneaded to prepare a positive electrode mixture (slurry). The slurry was applied on both surfaces of a piece of 20 μm thick aluminum foil serving as a current collector. After the processes of drying, pressing, and cutting, a 130 μm thick positive electrode including aluminum foil was obtained.

Negative Electrode 4

94 w/t parts of graphite powder as a negative electrode active material and 6 w/t parts of polyvinylidene fluoride as a binding agent were added. To this mixture, N-methylpyrrolidone as a dispersal solvent was added. Then, slurry was prepared kneading the mixture. The graphite powder used was a commercial highly crystalline graphite material, which is natural or artificial graphite covered with low crystalline carbon. The slurry was then applied on both surfaces of a piece of rolled copper foil of 10 μm in thickness. After processes of drying, pressing, and cutting, a 110 μm thick negative electrode including rolled copper foil was obtained.

[Separator 4]

An ordinary 20 μm thick polyethylene separator without the above hydrophilization was adopted.

An electrode group was formed by winding the positive electrode and the negative electrode prepared in the above mentioned manner, interposing separator 4 prepared in the above mentioned manner between the positive and negative electrodes. This electrode group is placed into a cylindrical battery container. Then, a predetermined amount of electrolyte is injected, and the upper lid is sealed by means of caulking thereafter. Thus, cylindrical lithium-ion secondary battery of comparative example 1 was obtained. The electrolyte adopted was prepared by dissolving 1 mol/liter of lithium hexafluorophosphate ($LiPF_6$) into the solution containing the volume ratio of EC:MEC:DEC=25:60:15. The designed capacity of each of the batteries was 1600 mAh.

Charge/discharge tests were performed for the batteries of the above examples 1 to 9 and comparative example 1, and the capacity and discharge voltage curves were compared. In measurements of capacity, each battery charged to 4.2V was discharged to the discharge cut-off voltage of 2.7 V at two-hour rate (2CA) and the capacity was derived from the product of the current value and time. The discharge average operating voltage of each of the batteries of the examples and comparative example was measured by calculating the integral value of the electrical energy per voltage sampling time interval from the constant-current discharge curve, and then dividing the integral value by the already calculated capacity. Here, it is understood that a battery exhibiting a higher average operating voltage at the discharge test at 2CA have a better flatness of the discharge curve and a better higher voltage maintaining characteristic. Further the discharge voltage of such a battery is high, and it takes a longer period before reaching the discharge termination voltage. As a result, the battery has a high capacity. Further, to evaluate the charging/discharging cycle life characteristic with a high current, each battery underwent a cycle of discharging (2.7V termination voltage) at 2CA and charging (4.2V, 1.5CA limited current) at 50° C., and the ratio of the capacity maintenance rate of the 200th cycle to the initial capacity was calculated. The result is shown in the table.

TABLE 1

|  | Positive electrode | Negative electrode | Separator | Average operating voltage | Cycle capacity rate |
|---|---|---|---|---|---|
| Example 1 | Positive electrode 1 | Negative electrode 1 | Separator 1 | 3.513 | 94 |
| Example 2 | Positive electrode 1 | Negative electrode 2 | Separator 1 | 3.499 | 90 |
| Example 3 | Positive electrode 2 | Negative electrode 1 | Separator 1 | 3.486 | 87 |
| Example 4 | Positive electrode 2 | Negative electrode 2 | Separator 1 | 3.469 | 84 |
| Example 5 | Positive electrode 1 | Negative electrode 1 | Separator 2 | 3.396 | 89 |
| Example 6 | Positive electrode 1 | Negative electrode 2 | Separator 2 | 3.380 | 85 |
| Example 7 | Positive electrode 2 | Negative electrode 1 | Separator 2 | 3.353 | 84 |
| Example 8 | Positive electrode 2 | Negative electrode 2 | Separator 2 | 3.341 | 81 |
| Example 9 | Positive electrode 3 | Negative electrode 3 | Separator 3 | 3.536 | 97 |
| Comparative Example 1 | Positive electrode 4 | Negative electrode 4 | Separator 4 | 3.330 | 77 |

From a result of discharge test at 2CA, the average operating voltage of example 9 was the highest among those of examples 1 to 9 and the comparative example, and that of example 1 was the second. Although the reduction of average voltage of the comparative example is restrained by the lower atomic ratio of Ni and the higher atomic ratio of Co and Mn, the resulting average operating voltage was considerably low compared to the examples of this invention. From these results, it is found that the operating voltages of examples 1 to 8 were higher than that of the comparative example, exhibiting the effects of adding vapor-grown graphite as a conductive agent to a fluorinated positive electrode material $LiNi_{0.8}Co_{0.1}Mn_{0.1}O_2$ or a negative electrode graphite material. Further, the batteries of examples 1 to 4 each adopting a separator hydrophlized with fluorine gas and oxygen gas exhibited higher discharge voltages than the batteries of examples 5 to 8 each adopting a separator without hydrophlization. This shows the effect of retaining electrolytic solution contributed to reduction of the battery resistance. Further, the battery of example 9 adopting as a conductive agent a mixture of vapor-grown graphite and carbon black resulted in even a lower resistance, and a higher discharge voltage. This is because graphite conductive agent has lower electric resistance compared to commercial cokes and low crystalline carbon material, and carbon black has chain polymer and contacts the positive electrode material particles at multiple points. Further, the graphite edges of the vapor-grown graphite material have isotropic orientation, so that it also enables retaining of conductivity to the particles of the positive electrode material through multiple contacts. This is believed to have contributed to the lower electric resistance, and the higher discharge voltage.

When an identical conductive agent added to the negative electrode, the reduction of the cycle capacity was preventable by 3 to 4% more compared to the one without the conductive agent. Thus, a battery having: a positive electrode containing fluorinated $LiNi_{0.8}Co_{0.1}Mn_{0.1}O_2$ where vapor-grown graphite or carbon black was added; a negative electrode layer where vapor-grown graphite or carbon black was also added; and a hydrophlized separator, possesses higher discharge voltage and power and better cycle characteristic while maintaining a higher capacity compared to a conventional battery.

In regard to the amount of the conductive agent added, 5 wt % or more of the conductive agent for the positive electrode or 2 wt % for the negative electrode will yield sufficient resistance value, when only the conductivity is considered. However, the conductive agent itself does not directly contribute to the capacity. When an excessive amount of the conductive agent is added, the capacity decreases in the positive electrode due to the lack of the amount of reactant in a predetermined volume. On the other hand, such an excessive amount of conductive agent will decrease the positive/negative electrode Ah rate which is an important factor for the cycle characteristic in the negative electrode (the redundancy of negative electrode reactant which is ascribable to the production of a resistance film on the negative electrode surface during a charge/discharge cycle). On this account, the optimum amount of the conductive agent in consideration of resistance and capacity, and resistance and cycle characteristic is 14 wt % or less in the positive electrode, and 6 wt % or less in the negative electrode.

Further, high atomic ratio of Ni provides advantages in cost performance and mass productivity. The main positive electrode materials of lithium-ion batteries having conventionally been considered are lithium cobalt oxide ($LiCoO_2$), lithium manganese oxide ($LiMn_2O_4$), and lithium nickel oxide ($LiNiO_2$). Each material has advantages and disadvantages. The capacity of the respective batteries respectively adopting $LiCoO_2$, $LiMn_2O_4$, and $LiNiO_2$ resulted in the following relation: $LiMn_2O_4 < LiCoO_2 < LiNiO_2$. Reversely, the discharge average voltage of the batteries resulted in the following relation: $LiNiO_2 < LiCoO_2 < LiMn_2O_4$. The relation of cycle characteristics of the batteries in general is $LiNiO2 << LiCoO2$. The safety of the batteries resulted in the following relation: $LiNiO_2 < LiCoO_2 < LiMn_2O_4$, and the relation of the batteries in terms of the relation of mass productivity and cost performance is $LiNiO_2 < LiCoO_2 < LiMn_2O_4$.

For the above reasons, $LiCoO_2$ has been chosen as the most compromising material of batteries for consumer use in terms of performance, mass productivity, and cost performance. However, since there is a limit to the improvements to capacity increase in terms of performance and to cost performance, $LiMn_2O_4$ was thought to be favorable. Nonetheless, due to the fact that a battery adopting $LiMn_2O_4$ is inferior to a battery adopting $LiCoO_2$ in the matter of cycle characteristics and capacity, $LiNiO_2$ was focused. Nevertheless, since $LiNiO_2$ has a critical disadvantage that it causes gelation when making slurry, materials adopting Co or Mn replacing the Ni site in $LiNiO_2$ are now being studied. This material adds the voltage characteristic of Mn and the cycle characteristics stability of Co, by sacrificing the high capacity of $LiNiO_2$; however, it cannot achieve both increased capacity and high power (retainability of high voltage).

This invention introduces how to develop a battery capable of maintaining a high discharge voltage of a nickel material whose average discharge voltage is low, while preventing the gelation of $LiNiO_2$ or Ni substituted material for atomic ratio rich Ni, and maintaining a higher capacity that Ni originally has. Gelation of slurry can be prevented by fluorinating $LiNi_{0.8}Co_{0.1}Mn_{0.1}O_2$ with a relatively rich Ni atomic ratio as in the examples. Further, high voltage was maintained by increasing the electron conductivity of the electrode by adding vapor-grown graphite and carbon black to the fluorinated $LiNi_{0.8}Co_{0.1}Mn_{0.1}O_2$. Further, these conductive agents were added to the negative electrode as well to increase the cycle maintenance of a battery capable of maintaining high voltage. Further, it is believed that the hydrophilization of a polyethylene separator increases its wettability to the polar solvent in the electrolyte solution, thereby enabling the separator to retain enough electrolyte solution, consequently decreasing the resistance of the separator. The battery obtained by achieving the mass productivity of the Ni material through the above improvements possesses an increased capacity and high power, and suppresses the cost. Further, a battery with a much higher capacity was obtained when the resistance of the negative electrode decreased more by further adding vapor-grown graphite or carbon black to the negative electrode material.

The examples and example discussed in the foregoing detailed explanation should not be narrowly interpreted within the limits of such examples and example, but rather may be applied in many variations within the scope of the patent claims set forth below. For instance, the present invention can be applied to any conventional lithium-ion secondary battery having: an electrode group formed by laminating or winding a negative electrode layer and a positive electrode material so as to interpose a separator made of synthetic resin, the negative electrode layer containing a material capable of intercalating/deintercalating lithium-ion, and the positive electrode material including a lithium-containing metallic oxide; and a non-aqueous electrolyte containing lithium salt, where the electrode group is immersed.

The invention claimed is:
1. A lithium-ion secondary battery, comprising:
an electrode group formed by laminating or winding a negative electrode layer and a positive electrode layer so as to interpose a separator made of synthetic resin, the negative electrode layer containing a material capable of intercalating/deintercalating lithium-ion, and the positive electrode layer including a fluorinated lithium-containing metallic oxide; and
a non-aqueous electrolyte containing lithium salt, where the electrodes are immersed, wherein the fluorinated lithium-containing metallic oxide is obtained by fluorination with fluorine gas of a metal oxide of formula $$LiNi_xCo_yMn_zO_2,$$

wherein
$0.6 \leq x < 1$,
$0 < y \leq 0.2$,
$0 < z \leq 0.2$ and
$x+y+z=1$ and
wherein a fluorine content of the fluorinated lithium-containing metallic oxide is from 0.01 to 0.2 wt % F.

2. The lithium-ion secondary battery according to claim 1, wherein the separator contains a hydrophilic group.

3. The lithium-ion secondary battery according to claim 2, wherein the hydrophilic group is a carboxyl group.

4. The lithium-ion secondary battery according to claim 1, wherein the positive electrode layer further comprises at least 5 wt % of vapor-grown graphite and carbon black.

5. The lithium-ion secondary battery according to claim 1, wherein the positive electrode layer further comprises 9-14 wt % of the vapor-grown graphite and carbon black.

6. The lithium-ion secondary battery according to claim 1, wherein the negative electrode layer further comprises at least 2 wt % of vapor-grown graphite and carbon black.

7. The lithium-ion secondary battery according to claim 1, wherein the negative electrode layer further comprises 3 to 6 wt % of the vapor-grown graphite and carbon black.

* * * * *